United States Patent
Kodialam et al.

(10) Patent No.: US 7,359,384 B2
(45) Date of Patent: Apr. 15, 2008

(54) SCHEDULING OF GUARANTEED-BANDWIDTH LOW-JITTER TRAFFIC IN INPUT-BUFFERED SWITCHES

(75) Inventors: Muralidharan S. Kodialam, Marlboro, NJ (US); Tirunell V. Lakshman, Morganville, NJ (US); Dimitrios Stiliadis, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1084 days.

(21) Appl. No.: 10/348,385

(22) Filed: Jan. 21, 2003

(65) Prior Publication Data

US 2003/0227901 A1    Dec. 11, 2003

Related U.S. Application Data

(60) Provisional application No. 60/387,541, filed on Jun. 10, 2002.

(51) Int. Cl.
*H04L 12/56* (2006.01)
(52) U.S. Cl. .................. 370/395.4; 370/423
(58) Field of Classification Search .......... 370/351, 370/389, 395.4, 423, 422, 375
See application file for complete search history.

(56) References Cited

U.S. PATENT DOCUMENTS

| | | | | |
|---|---|---|---|---|
| 5,381,404 A | * | 1/1995 | Sugano et al. | 370/238 |
| 5,541,914 A | * | 7/1996 | Krishnamoorthy et al. | 370/427 |
| 5,634,004 A | * | 5/1997 | Gopinath et al. | 710/317 |
| 5,680,634 A | * | 10/1997 | Estes | 712/15 |
| 5,850,399 A | * | 12/1998 | Ganmukhi et al. | 370/412 |
| 5,852,740 A | * | 12/1998 | Estes | 712/15 |
| 5,905,730 A | * | 5/1999 | Yang et al. | 370/429 |
| 5,925,097 A | * | 7/1999 | Gopinath et al. | 709/200 |
| 6,195,187 B1 | * | 2/2001 | Soref et al. | 398/9 |
| 6,704,312 B1 | * | 3/2004 | Chang et al. | 370/389 |
| 2002/0027902 A1 | * | 3/2002 | Reeve et al. | 370/355 |

OTHER PUBLICATIONS

Chang et al, On Service Guarantees for Input Buffered Crossbar Switches: A Capacity Decomposition Approach by Birkhoff and Von Neumann: 1999 Seventh International Workshop Seminar (1999) pp. 79-86.*

* cited by examiner

*Primary Examiner*—Kwang Bin Yao
*Assistant Examiner*—Andrew Lai

(57) ABSTRACT

A switch schedules guaranteed-bandwidth, low-jitter-traffic characterized by a guaranteed rate table (GRT) method. A rate matrix generated from collected provisioning information is decomposed into schedule tables by a low jitter (LJ) decomposition method. The LJ decomposition method imposes a set of constraints for the schedule tables: schedule tables are partial permutation matrices, weighted sum of the partial permutation matrices is greater than or equal to the weighted sum of the rate matrix, and each entry in the rate matrix belongs to one element of the LJ decomposition schedule matrices. An integer LJ decomposition programming problem is employed to generate the schedule tables that are scheduled for each time slot of the period of the switch. Schedule tables are selected in turn based upon selecting eligible tables having the earliest finishing time. If necessary, the rate matrix is updated prior to decomposition for a subsequent period.

23 Claims, 4 Drawing Sheets

SCHEDULING OF GUARANTEED-BANDWIDTH LOW-JITTER TRAFFIC IN INPUT-BUFFERED SWITCHES

CROSS-REFERENCE TO RELATED APPLICATIONS

This application claims the benefit of the filing date of U.S. provisional application No. 60/387,541 filed on Jun. 10, 2002.

BACKGROUND OF THE INVENTION

1. Field of the Invention

The present invention relates to routing connections in a telecommunications network, and, more particularly, to scheduling of traffic connections in input-buffered switches.

2. Description of the Related Art

Input-buffered crossbars are widely used in scaleable, high-speed switches of telecommunications networks since input-buffered crossbars achieve a specified capacity using a lower memory bandwidth than output-buffered switches. Since memory and memory access tends to be the slowest component of a switching system, increasing the scale (or size) of a switch requires reducing memory speed requirements. A number of methods for maximizing the performance of input-buffered architectures have been proposed in the prior art, and an input-buffered switch with virtual output queuing may achieve 100% throughput under arbitrary traffic patterns. Methods are also known in the prior art for input-buffered switch emulation of the quality-of-service behavior of output-buffered-switches for a general class of scheduling disciplines. However, these methods require complex arbitration schemes that execute at every switch scheduling instant (i.e., at the time scale of packet-transmission times).

One class of traffic that requires scheduling is jitter-constrained traffic where the bandwidth requirements of the traffic are known a priori. This scheduling is primarily motivated by the needs of an EF traffic class in a diff-serv framework, and the requirements of bandwidth-guaranteed, low-jitter traffic in MPLS networks. In diff-serv networks, each router is configured to achieve certain per-hop behavior (i.e., behavior through the path between switches). For the EF traffic class, bandwidth is provisioned between the input and output interfaces of a router. Considering the switch fabric of the router, this bandwidth provisioning results in the generation of a "rate matrix" whose elements specify the bandwidth need between every input-output port pair of the switch fabric (e.g., rows of the rate matrix correspond to input ports and columns correspond to output ports). Since this bandwidth need is for carrying EF traffic, the switch must satisfy these bandwidth needs while also satisfying additional stringent requirements on the tolerable jitter. The rate matrix of the switch changes relatively slowly and might be on the order of the provisioning time scales for per-hop behavior.

One method of jitter-constrained, bandwidth-guaranteed scheduling makes the input-buffered switch emulate an output-buffered switch with a fair-queuing scheduler. However, this emulation 1) is complex to implement at high speeds, and 2) does not make use of the fact that the rates through the switch change relatively slowly and are re-computed at packet-transmission time scales.

When the rates are known, an alternative method uses a fixed schedule for time-division multiplexing (TDM) of the switch fabric. The TDM schedule is recalculated only when the rate matrix changes, i.e., when the per-hop behavior if re-provisioned. Input ports may generally maintain different queues for each output port (Virtual Output Queuing), and switching is performed using constant-size packets termed "envelopes" or "slots."

The static TDM method is referred to as the Guaranteed Rate Table (GRT) method. The basis of the GRT method is that once a rate matrix is provided, the rate matrix is decomposed into schedule tables. The GRT method ensures that every input port has the opportunity to transmit to every output port with a frequency sufficient to guarantee bandwidth needs. These transmission opportunities must be distributed appropriately to satisfy jitter constraints. A reasonable switch design combines the GRT scheme with a throughput-maximizing, matching scheduler that schedules best-effort traffic to utilize the slots not used by the GRT scheme.

A disadvantage of the GRT method is the relatively long time required for calculation of the switch schedule by the method. For a fixed-rate matrix, the schedule is periodic, and consists of a sequence of schedule tables implemented during time slots of the period. Each schedule table represents an interconnection between the input ports and the output ports for a given time slot with the constraint that each input port is connected to at most one output port and each output port is connected to at most one input port. A schedule table for an n×n switch may be represented as an n×n matrix containing zeros and ones such that each row sum and column sum of the matrix is at most one. A "1" in the schedule table position defined by row i and column j of the schedule table's n×n matrix implies that input port i is connected to output port j in this time slot. If each row sum and column sum is exactly one, then each input port is matched to exactly one output port and vice versa. This matrix is termed a permutation matrix. A matrix whose row sums and column sums are at most one without it being a permutation matrix is termed a partial permutation matrix. Therefore, a schedule table may be represented as a permutation matrix or a partial permutation matrix. If the schedule table is a partial permutation matrix, then the input ports and output ports that are not matched may be used to schedule best-effort traffic.

The collection of schedule tables that represent the rate matrix determine the time scale for bandwidth guarantees and the jitter performance that may be achieved by the switch for a given switch capacity. The total amount of bandwidth needed to support all the schedule tables is termed the bandwidth requirement of the switch schedule. In order for a switch schedule to be feasible, the bandwidth requirement of the switch schedule should be less than the switch bandwidth.

In addition, for good bandwidth and jitter performance, there are two additional desirable properties for the scheduling algorithm implementing the switch schedule. First, the execution time of the scheduling method should not be too large since the algorithm may need to run on a switch control processor and not on a high-end computer. Also, even though the rate matrix does not change at packet-switching time scales, it is desirable to have the option of changing the rate matrix at connection-arrival time scales (as for instance in MPLS networks). Second, the number of schedule tables should be relatively small since the tables may need to be stored in a switch schedule arbitrator close to the switch fabric and the memory taken up for table storage should be relatively small.

Prior art scheduling methods for calculating schedule tables are generally based on Birkhoff Von-Neumann (BV) decomposition. BV decomposition employs a BV algorithm that minimizes the bandwidth requirement for the switch schedule while providing provisioned bandwidth guarantees. The BV algorithm does not take into account jitter performance, and a straightforward implementation of the BV algorithm may lead to extremely high jitter that does not meet the requirements of EF class service. The time complexity (related to the execution time) of the BV algorithm is on the order of $n^{4.5}$ (represented mathematically as $O(n^{4.5})$), and the number of schedule tables is $O(n^2)$. These time and space requirements make the algorithm impractical for a high-speed switch implementation.

Recalling that each schedule table may be defined as a permutation matrix or a partial permutation matrix, the basis of the BV decomposition is that any doubly stochastic matrix can be written as a convex combination of permutation matrices. Therefore, the BV decomposition of the rate matrix R generates a set of permutation matrices (schedule tables) $Y^k$ for k=1,2, . . . , K from the relation as given in equation (1):

$$R = \sum_{k=1}^{K} \alpha_k Y^k, \quad (1)$$

where each $\alpha_k$ is a constant, and equation (2) gives the relation for the ith row and jth column rate entry $r_{ij}$ of the rate matrix:

$$r_{ij} = \sum_{k=1}^{K} \alpha_k Y_{ij}^k. \quad (2)$$

The bandwidth requirement BR of the schedule tables (i.e., the BR of the switch schedule) generated by the BV decomposition is given by equation (3):

$$BR = \sum_{k=1}^{K} \alpha_k = M, \quad (3)$$

where M is the row and column sum of the rate matrix. Thus, the BV decomposition minimizes the bandwidth requirement.

The permutation (switching) matrices may be scheduled across the switch using a Weighted Round Robin (WRR) scheduling method. A BV decomposition may be illustrated with the following (4×4) rate matrix R in equation (4):

$$R = \begin{bmatrix} 0.38 & 0 & 0.22 & 0.40 \\ 0.11 & 0.24 & 0.60 & 0.05 \\ 0 & 0.53 & 0.14 & 0.33 \\ 0.51 & 0.23 & 0.04 & 0.22 \end{bmatrix} \quad (4)$$

All the row and column sums of the rate matrix R are one (i.e., the rate matrix is doubly stochastic).

The BV decomposition of the rate matrix of equation (4) is shown below in equation (5):

$$R = 0.14 \begin{bmatrix} 1 & 0 & 0 & 0 \\ 0 & 1 & 0 & 0 \\ 0 & 0 & 1 & 0 \\ 0 & 0 & 0 & 1 \end{bmatrix} + 0.23 \begin{bmatrix} 1 & 0 & 0 & 0 \\ 0 & 0 & 1 & 0 \\ 0 & 0 & 0 & 1 \\ 0 & 1 & 0 & 0 \end{bmatrix} + 0.10 \begin{bmatrix} 0 & 0 & 1 & 0 \\ 0 & 1 & 0 & 0 \\ 0 & 0 & 0 & 1 \\ 1 & 0 & 0 & 0 \end{bmatrix} + \quad (5)$$

$$0.01 \begin{bmatrix} 1 & 0 & 0 & 0 \\ 0 & 0 & 1 & 0 \\ 0 & 1 & 0 & 0 \\ 0 & 0 & 0 & 1 \end{bmatrix} + 0.36 \begin{bmatrix} 0 & 0 & 0 & 1 \\ 0 & 0 & 1 & 0 \\ 0 & 1 & 0 & 0 \\ 1 & 0 & 0 & 0 \end{bmatrix} + 0.04 \begin{bmatrix} 0 & 0 & 0 & 1 \\ 1 & 0 & 0 & 0 \\ 0 & 1 & 0 & 0 \\ 0 & 0 & 1 & 0 \end{bmatrix} +$$

$$0.07 \begin{bmatrix} 0 & 0 & 1 & 0 \\ 1 & 0 & 0 & 0 \\ 0 & 1 & 0 & 0 \\ 0 & 0 & 0 & 1 \end{bmatrix} + 0.05 \begin{bmatrix} 0 & 0 & 1 & 0 \\ 0 & 0 & 0 & 1 \\ 0 & 1 & 0 & 0 \\ 1 & 0 & 0 & 0 \end{bmatrix}$$

The BV decomposition shown in equation (5) has 8 schedule tables, and this BV decomposition of the rate matrix in equation (4) is not unique. In the BV decomposition of the rate matrix R, a given entry $r_{ij}$ is divided and spread ("striped") across several permutation matrices. Therefore, independent of the type of algorithm used to schedule the permutation matrices, there is no control on when individual entries in the rate matrix will be scheduled. It is possible to derive bounds on the jitter, but it is not possible to ensure that the jitter is low. The bounds on the jitter for the traffic between input port i and output port j depend on the number of matrices in the decomposition that $r_{ij}$ is striped across and also on the number of matrices in the decomposition. Since both these factors increase with the number of ports in the switch, the jitter problem becomes severe when the number of ports is large. The BV decomposition, therefore, results in poor jitter performance especially when there is a large number of ports in the switch.

SUMMARY OF THE INVENTION

In accordance with embodiments of the present invention, guaranteed-bandwidth low-jitter traffic characterized by a guaranteed rate table (GRT) method is scheduled for service. A rate matrix is generated from collected provisioning information. The rate matrix for a scheduling period is decomposed into schedule tables by a low jitter (LJ) decomposition method. The LJ decomposition method imposes a set of constraints for the schedule tables: that the schedule tables are partial permutation matrices, that the weighted sum of the permutation matrices is greater than or equal to the weighted sum of the rate matrix, and that each entry in the rate matrix belongs to one element of the LJ decomposition schedule matrices. For some embodiments, an integer LJ decomposition programming problem is then solved to generate the schedule tables. The schedule tables are scheduled for each time slot of the scheduling period of the switch. Schedule tables are each selected in turn until all schedule tables are used based upon selecting eligible tables having the shortest finishing time. If necessary, the rate matrix is updated prior to decomposition for a subsequent period.

In accordance with an exemplary embodiment of the present invention, one or more connections between input ports and output ports of a switch are routed by: (a) generating a rate matrix for the one or more connections, wherein each element of the rate matrix defines a bandwidth value for a connection between an input port and an output port of the switch during a scheduling period; (b) decomposing the rate matrix into a set of schedule tables with a low-jitter decomposition algorithm having a set of constraints; and (c) scheduling each schedule table during time slots of the scheduling period in accordance with the weight associated with the scheduling table.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In accordance with the present invention, a low-jitter, switch-scheduling method exhibits relatively better jitter performance, while reducing the number of schedule tables, when compared to prior art switch-scheduling algorithms. The low-jitter, switch-scheduling method is based on a decomposition of a rate matrix into schedule tables that ensures that each entry in the rate matrix belongs to only one element in the decomposition. The number of distinct schedule tables is on the order of n (mathematically, O(n)), where n is the number of row or column entries in the n×n rate matrix. Reducing the number of schedule tables provides the advantage of reducing the amount of high-speed memory needed in the switch arbitrator as well as the execution time of the low-jitter, switch-scheduling method.

Figure 1:
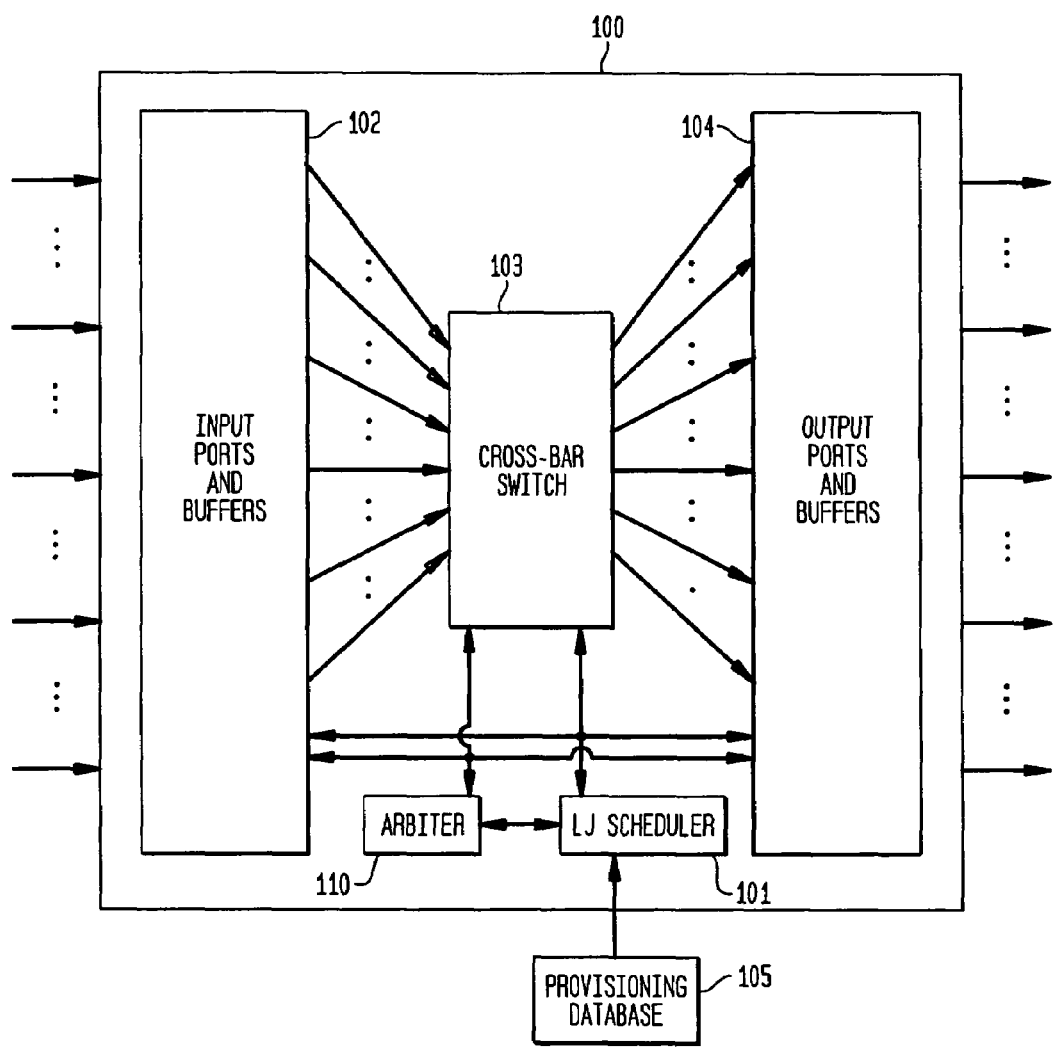
FIG. 1 shows a switch having a low-jitter scheduler implementing an exemplary embodiment of the present invention.

FIG. 1 shows a switch 100 having a low-jitter (LJ) scheduler 101 implementing an exemplary embodiment of the present invention. Switch 100 is an n×n input-output-buffered packet switch with virtual output queuing. In each time slot, central arbiter 110 matches each of output ports 104 to at most one of input ports 102. Cross-bar switch 103 couples selected ones of input ports 102 to corresponding selected ones of output ports 104. Cross-bar switch 103 couples input ports to output ports based on a schedule table from LJ scheduler 101 under the control of arbiter 110. For the portion of the input traffic that has bandwidth and jitter requirements, the rates required for each input/output port pair are known from, for example, information provided from provisioning database 105. Within a packet network, such as the Internet, this rate information is supplied to switch 100 either through a bandwidth broker or through MPLS signaling.

Arbiter 110 matches output ports to input ports via scheduling tables generated and scheduled, as described subsequently, by LJ scheduler 101. Arbiter 110 and LJ scheduler 101 are shown in FIG. 1 as separate modules. However, one skilled in the art would realize that both arbiter 110 and LJ scheduler 101 may be implemented within the general processor of an input-output-buffered packet switch. As described herein, LJ scheduler 101 schedules traffic through switch 100 that is provisioned as bandwidth-guaranteed, low-jitter traffic specified by a guaranteed rate table (GRT), also termed a rate matrix. Other traffic, such as best-effort traffic, may be scheduled using matching algorithms of the prior art.

Figure 2:
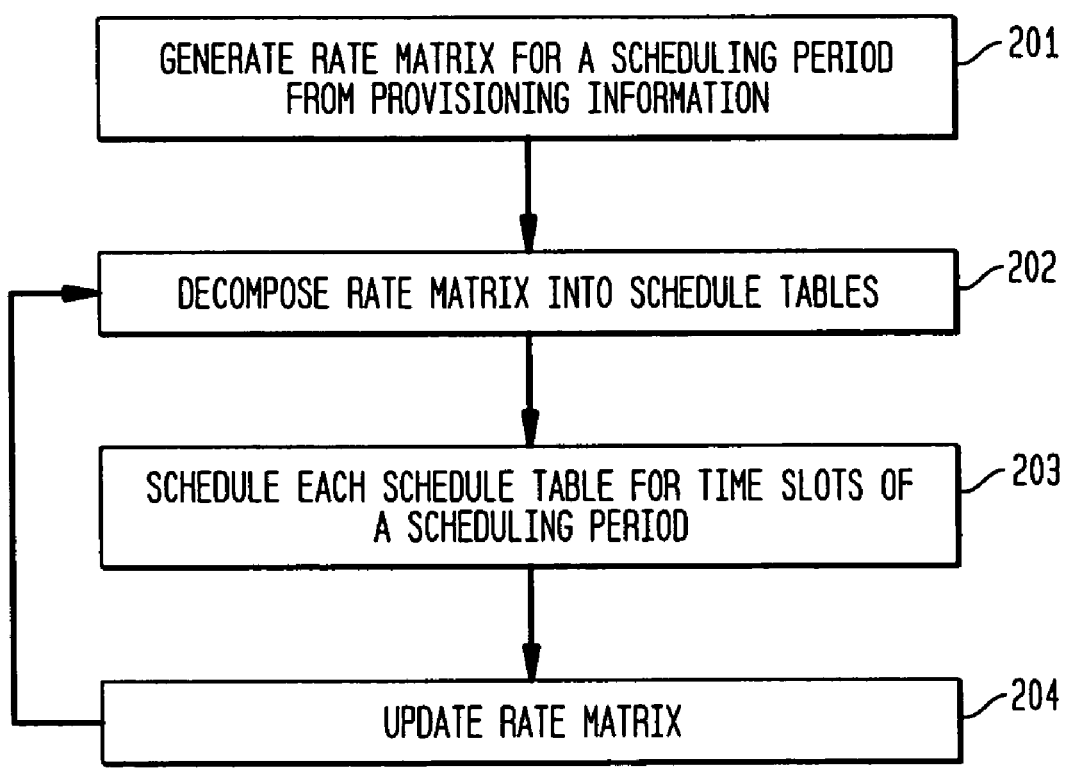
FIG. 2 shows an exemplary method of low-jitter scheduling employed by the low-jitter scheduler of FIG. 1.

FIG. 2 shows an exemplary method of low-jitter scheduling employed by the low-jitter scheduler of FIG. 1. First, at step 201, the GRT is generated from collected provisioning information as follows. P is defined as the per-port capacity of the fabric; the GRT is represented by an n×n rate matrix $R=[r_{ij}]$, where $r_{ij}$ represents the rate required from input port i to output port j; and M represents the maximum row or column sum of the matrix R. As is known in the art, R may be augmented into a matrix $R'=[r'_{ij}]$ where all the row and column sums of R' are equal to M. The GRT may be scheduled (without jitter constraints) if and only if $P \geq M$. In other words, the aggregate capacity towards any port is less than or equal to the capacity of the port, and similarly the aggregate capacity from a switch port is less than or equal to the capacity of that port. A non-negative matrix, all of whose row and column sums are equal to one, is termed a doubly stochastic matrix. A rate matrix may always be normalized by M to generate a doubly stochastic matrix.

At step 202, the GRT matrix R for a scheduling period is decomposed into schedule tables, such as by the method described with respect to FIG. 3 below. At step 203, the schedule tables are scheduled for each time slot of the scheduling period (e.g., of switch 100), such as by the method described with respect to FIG. 4 below. A time slot corresponds to a predefined unit or period of time during which, for example, crossbar switch 103 of FIG. 1 connects one or more input ports to one or more output ports. At step 203, scheduling of schedule tables selects each table in turn until all schedule tables are used. At step 204, if necessary, the GRT (rate matrix) R is updated, and the method returns to step 202.

Decomposition employed at step 202 of FIG. 2 is now described and is termed low jitter (LJ) decomposition. As in Birkhoff Von-Neumann (BV) decomposition, the rate matrix R is decomposed into a combination of permutation matrices. However, unlike in BV decomposition, LJ decomposition further includes the restriction that each non-zero entry in the rate matrix R appears in only one element of the LJ decomposition matrices. Let $X^k$, k=1,2, . . . ,K be the set of matrices that form the LJ decomposition. Matrix $X^k$ has elements $[x_{ij}]$, and associated with each matrix $X^k$ in the decomposition is a rate $m_k$, which signifies the bandwidth requirement for the matrix $X^k$.

Equations (6) through (10) list a set of constraints upon the elements $[x_{ij}]$ of each matrix $$\sum_k m_k x_{ij}^k \geq r_{ij} \forall\, i, j \tag{6}$$

$$\sum_k x_{ij}^k = 1 \forall\, i, j \tag{7}$$

$$\sum_i x_{ij}^k \leq 1 \forall\, j, k \tag{8}$$

$$\sum_j x_{ij}^k \leq 1 \forall\, i, k \tag{9}$$

$$x_{ij}^k \in \{0,1\} \forall i, j, k \tag{10}$$

The constraints of equations (8), (9), and (10) specify that matrix $X^k$ is a partial permutation matrix. Constraint (6)

specifies that the weighted sum of these permutation matrices should be greater than or equal to that of the rate matrix. Constraint (7) forces each entry in the rate matrix to belong to precisely one element in the LJ decomposition matrices. Unlike the BV decomposition, which uses only (full) permutation matrices, LJ decomposition splits the rate matrix into partial permutation matrices.

The number of matrices in the LJ decomposition is at most 2n−1. Each matrix in the LJ decomposition is maximal, and since a given entry in the rate matrix has at most n−1 other non-zero entries on its row and column, there are at most (n−1)+(n−1)=2n−2 decomposition matrices in which it cannot appear.

The bandwidth requirement D for the switch schedule is the sum of the rates $m_k$. Therefore the objective of the LJ decomposition is to solve the following integer LJ decomposition programming problem (ILJD) of equation (11):

$$D = \min \sum_{k=1}^{K} m_k$$

subject to the constraints of equations (6) through (10) above.

Since the BV decomposition of the prior art solves the above problem without constraint of equation (7), the bandwidth requirement D of the prior art BV decomposition is greater than or equal to M. As in the case of prior art BV decomposition, the LJ decomposition of the rate matrix is not unique. Unlike the BV decomposition, the ILJD is NP-hard.

Two important considerations in TDMA scheduling (especially for satellite scheduling) are 1) minimizing the number K of matrices in the decomposition, and 2) minimizing the total bandwidth requirement D needed to support the decomposition. Each entry in the rate matrix belongs to one element in the decomposition and, thus, it is possible to schedule the matrices to guarantee low jitter. Since deriving the decomposition is NP-hard, a lower bound on D is derived for a heuristic algorithm to solve the ILJD.

An approximation to the optimal solution for the ILJD sorts each row of the matrix R in descending order to generate the matrix R'. The maximum $m_j$ of each column j of the matrix R' is selected, and the value of $$\sum_{j=1}^{n} m_j$$

is a lower bound on D. Similarly, each column of R is sorted in descending order to get the matrix R'', the maximum $g_i$ of each row i of R'' is selected, and the value of $$\sum_{i=1}^{n} g_i$$

is a lower bound on D. The higher of the two lower bounds computed above is the lower bound on D and is tighter than M. One skilled in the art would realize that columns may be sorted first, followed by sorting of rows.

The bounds of D may be illustrated using the rate matrix of equation (4). First, the rows of R are sorted in descending order to obtain the matrix R' given in equation (12):

$$R' = \begin{bmatrix} 0.40 & 0.38 & 0.22 & 0 \\ 0.60 & 0.24 & 0.11 & 0.05 \\ 0.53 & 0.33 & 0.14 & 0 \\ 0.51 & 0.23 & 0.22 & 0.04 \end{bmatrix}$$

The sums for each column are computed and the maximum sum of the columns determined, which maximum value is (0.60+0.38+0.22+0.05)=1.25. Then each column is sorted in descending order to obtain the matrix R'' as in equation (13):

$$R'' = \begin{bmatrix} 0.51 & 0.53 & 0.60 & 0.40 \\ 0.38 & 0.24 & 0.22 & 0.33 \\ 0.11 & 0.23 & 0.14 & 0.22 \\ 0 & 0 & 0.04 & 0.05 \end{bmatrix} \quad (13)$$

The sums for each row are computed and the maximum sum of the rows determined, which maximum value is (0.60+0.38+0.23+0.05)=1.26. Therefore, the lower bound for this decomposition (as an approximate solution to the integer problem ILJD) is 1.26. Given a particular matrix $X^k$ in the LJ decomposition, the rate $m_k$ associated with this matrix is the largest entry in the rate matrix R that is covered by this matrix $X^k$. Therefore, the total amount of bandwidth may be optimized by covering entries of roughly equal size with the same matrix. The entries of this same matrix should not share the same row or column in order to satisfy the constraints of the decomposition.

Figure 3:
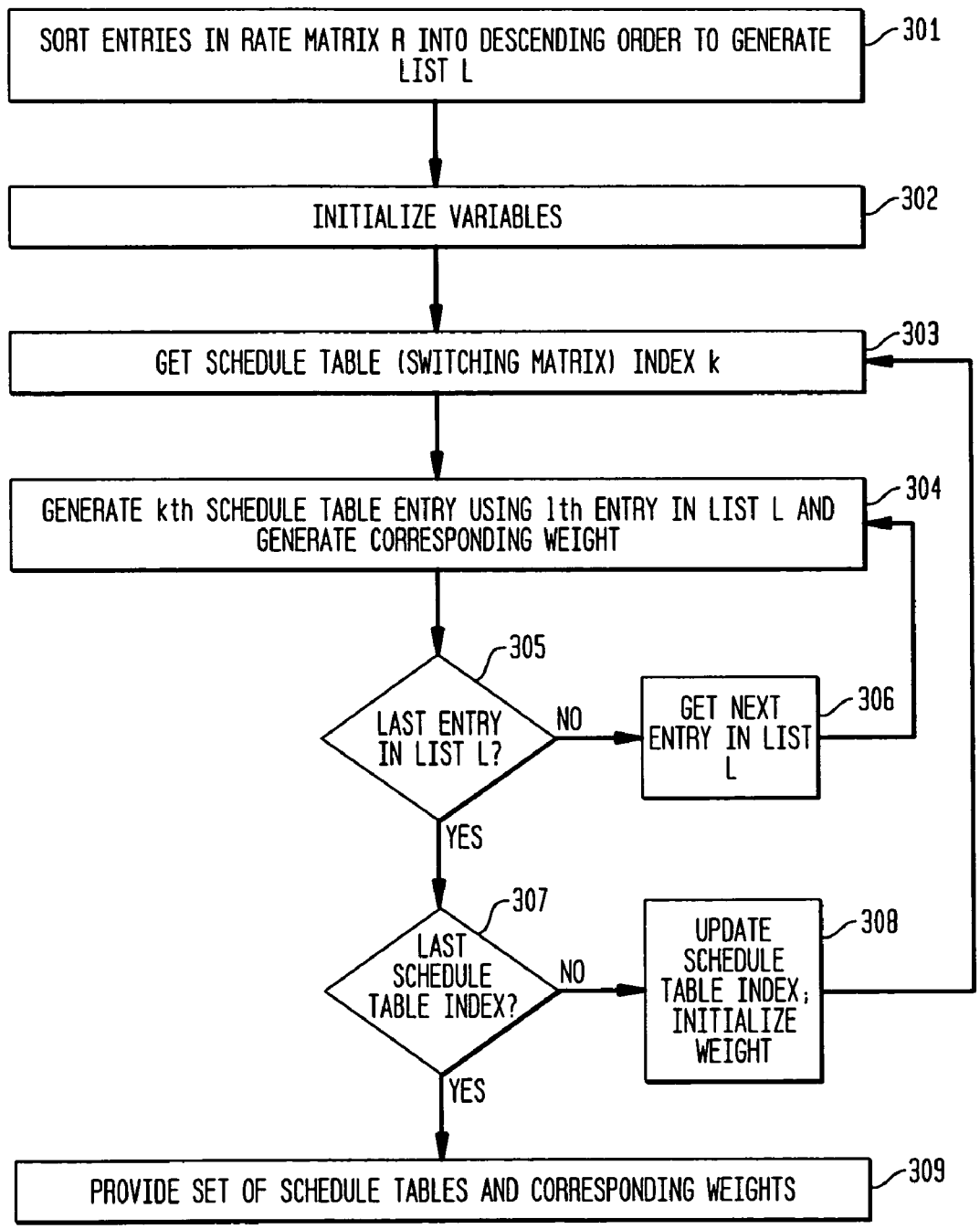
FIG. 3 shows an exemplary method of decomposing a rate table into schedule tables employed by the method of FIG. 2.

FIG. 3 shows an exemplary method of decomposing a rate matrix (table) into schedule tables employed by step 202 of the method of FIG. 2. The method of FIG. 3, termed Greedy Low Jitter Decomposition (GLJD) method, provides an approximate solution to the integer programming problem ILJD. First, at step 301 the elements in R are sorted in descending order and put in an ordered list L. Each element in L corresponds to some element $r_{ij}$ in the matrix R. Two elements in the list L are non-conflicting if these two elements do not belong to the same row or column in R. At step 302, the counting and the row and column variables are initialized. Specifically, for list element $L(m)=r_{ij}$, the row variable $\rho(m)$ is set to i, and the column variable $\kappa(m)$ is set to j.

At step 303, the method gets the index for the kth decomposition sub-matrix. At step 304, the method sets each element of the kth decomposition sub-matrix by traversing the list L from the top using the row and column variables and picking non-conflicting elements in list L greedily. Once an element in list L is inserted into the decomposition sub-matrix (e.g., L(l) is inserted), the element L(l) is deleted from the list L. In addition, the weight Mk associated with the kth decomposition sub-matrix is set to the value of L(l) if L(l) is greater than the current value of the weight $m_k$.

At step 305, a test determines if the last entry in the list L was examined. If the test of step 305 determines that the last entry in L was not examined, the method advances to step 306 to get the next (lower) entry in the list L. From step 306, the method returns to step 304.

If the test of step 305 determines that the last entry in L is examined, the method advances to step 307. At step 307, the method determines whether a new decomposition sub-matrix is necessary (i.e., the list L still contains some elements). If the test of step 307 determines that another decomposition sub-matrix is necessary, at step 308 the schedule table index k is updated (e.g., k=k+1, and the (k−1)th sub-matrix weight $m_{k-1}$ is set to 0), and the method returns to step 303.

If the test of step 307 determines that the last schedule table index of the last entry in L is found, the method advances to step 309. At step 309, the set of schedule tables $X^k$ and corresponding weights $m_k$ are provided. A worst-case running time of the algorithm is $O(n^3)$.

Returning to the illustration described above, the GLJD method for solving the integer programming problem ILJD generates the following decomposition of equation (14) for the exemplary rate matrix of equation (4):

$$R \leq 0.60 \begin{bmatrix} 0 & 0 & 0 & 1 \\ 0 & 0 & 1 & 0 \\ 0 & 1 & 0 & 0 \\ 1 & 0 & 0 & 0 \end{bmatrix} + 0.38 \begin{bmatrix} 1 & 0 & 0 & 0 \\ 0 & 1 & 0 & 0 \\ 0 & 0 & 0 & 1 \\ 0 & 0 & 1 & 0 \end{bmatrix} \quad (14)$$

$$+ 0.23 \begin{bmatrix} 0 & 0 & 1 & 0 \\ 1 & 0 & 0 & 0 \\ 0 & 0 & 0 & 0 \\ 0 & 1 & 0 & 0 \end{bmatrix} + 0.22 \begin{bmatrix} 0 & 0 & 0 & 0 \\ 0 & 0 & 0 & 0 \\ 0 & 0 & 1 & 0 \\ 0 & 0 & 0 & 1 \end{bmatrix}$$

$$+ 0.05 \begin{bmatrix} 0 & 0 & 0 & 0 \\ 0 & 0 & 0 & 1 \\ 0 & 0 & 0 & 0 \\ 0 & 0 & 0 & 0 \end{bmatrix}$$

The LJ decomposition heuristic has value (0.60+0.30+0.23+0.22+0.05)=1.48. In comparison, a more formal solution to the ILJD may be may be generated using a mathematical program (e.g., CPLEX) to generate the relatively optimal LJ decomposition of R in equation (15):

$$R = 0.60 \begin{bmatrix} 0 & 0 & 0 & 1 \\ 0 & 0 & 1 & 0 \\ 0 & 1 & 0 & 0 \\ 1 & 0 & 0 & 0 \end{bmatrix} + 0.05 \begin{bmatrix} 0 & 0 & 0 & 0 \\ 0 & 0 & 0 & 1 \\ 0 & 0 & 0 & 0 \\ 0 & 0 & 1 & 0 \end{bmatrix} \quad (15)$$

$$+ 0.33 \begin{bmatrix} 0 & 0 & 1 & 0 \\ 1 & 0 & 0 & 0 \\ 0 & 0 & 0 & 1 \\ 0 & 1 & 0 & 0 \end{bmatrix} + 0.38 \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

The LJ decomposition of equation (15) has a value for D of (0.60+0.38+0.33.4+0.05)=1.36. Consequently, comparing the heuristic solution of equation (14) with the more formal solution of equation (15), if the switch speed P<1.48, then the LJ decomposition heuristic may not be employed to schedule the EF class traffic. A value of P≧1 is desirable in order for the matrix to be schedulable.

Pseudo-code implementing the GLJD method of FIG. 3 is given below:

GREEDY_LOW_JITTER_DECOMPOSITION

100: Sort the entries in R in descending order to create list L.
101: If $L(m)=r_{ij}$ then set $\rho(m)=i$ and $\kappa(m)=j$;
102: k=1;
103: While L≠0
104: Set $m_k$=0 and l=1
105: Set C[j]=0∀j=1,2, . . . ,n
106: While (Not end of list L)
107: While (C[ρ[l]]=0 and C[κ(l)]=0)
108: $X_{\rho(l)\kappa(l)}^k=1$
109: C[ρ(l)]=C[κ(l)]=1
110: If (L(l)>$m_k$) $m_k$=L(l)
111: Eliminate entry l from list L.
112: l←l+1
113: k←k+1
114: Output the matrices $X^k$ and the corresponding weights $m_k$ Returning to FIG. 2, once the rate matrix is decomposed into schedule tables, these schedule tables are scheduled at step 203 for running by the switch over one or more time slots to implement the switch schedule. An exemplary method of scheduling the schedule tables that maintains relatively low jitter is now described.

Since the element $r_{ij}$ of the rate matrix is the desired rate from input port i to output port j, under ideal conditions it is desirable when i is matched to j for the time slots to be spaced $$\frac{1}{r_{ij}}$$

apart to form points $$0, \frac{1}{r_{ij}}, \frac{2}{r_{ij}}, \frac{3}{r_{ij}}, \ldots.$$

However, since there are multiple connections that share the same bandwidth, this spacing may not always be possible to achieve, so a modified spacing with a slightly degraded jitter performance is employed. A connection is termed a "low-jitter" connection if there is exactly one match for this connection in each of the time intervals $$\left[\frac{m}{r_{ij}}, \frac{m+1}{r_{ij}}\right],$$

where m is an integer greater than or equal to 0. After LJ decomposition such as described with respect to FIG. 3, K schedule tables are available for scheduling during the time slots. The value $m_k$ is defined as the bandwidth for the switching matrix $X^k$ and the value D is given in equation (16):

$$D = \sum_{k=1}^{K} m_k, \quad (16)$$

where D≦P, and P is the switch speed. The variable $\phi_k$ represents the fraction of timeslots that should use the schedule table (switching matrix) $X^k$, $\phi_k$ is equivalent to $m_k$/P, and the sum of the $\phi_k$ values is less than 1. The kth matrix is scheduled at a rate $\phi_k$, termed the scheduling rate of the schedule table. Since each port pair belongs in exactly one matrix in the decomposition, the jitter for each port pair may be controlled individually. The time slot $T_k^j$ represents the time slot in which the kth schedule table is scheduled for the $j^{th}$ time. For low jitter, it is desirable for the relation of equation (17) to hold true:

$$\frac{j}{\phi_k} \le T_k^j \le \frac{j+1}{\phi_k}. \quad (17)$$

The start time $A_k^j$ and the finish time $B_k^j$ for the $j^{th}$ time slot that the kth schedule table is used are given in equations (18) and (19), respectively:

$$A_k^j = \frac{j}{\phi_k}, \text{ and} \quad (18)$$

$$B_k^j = \frac{j+1}{\phi_k}. \quad (19)$$

Figure 4:
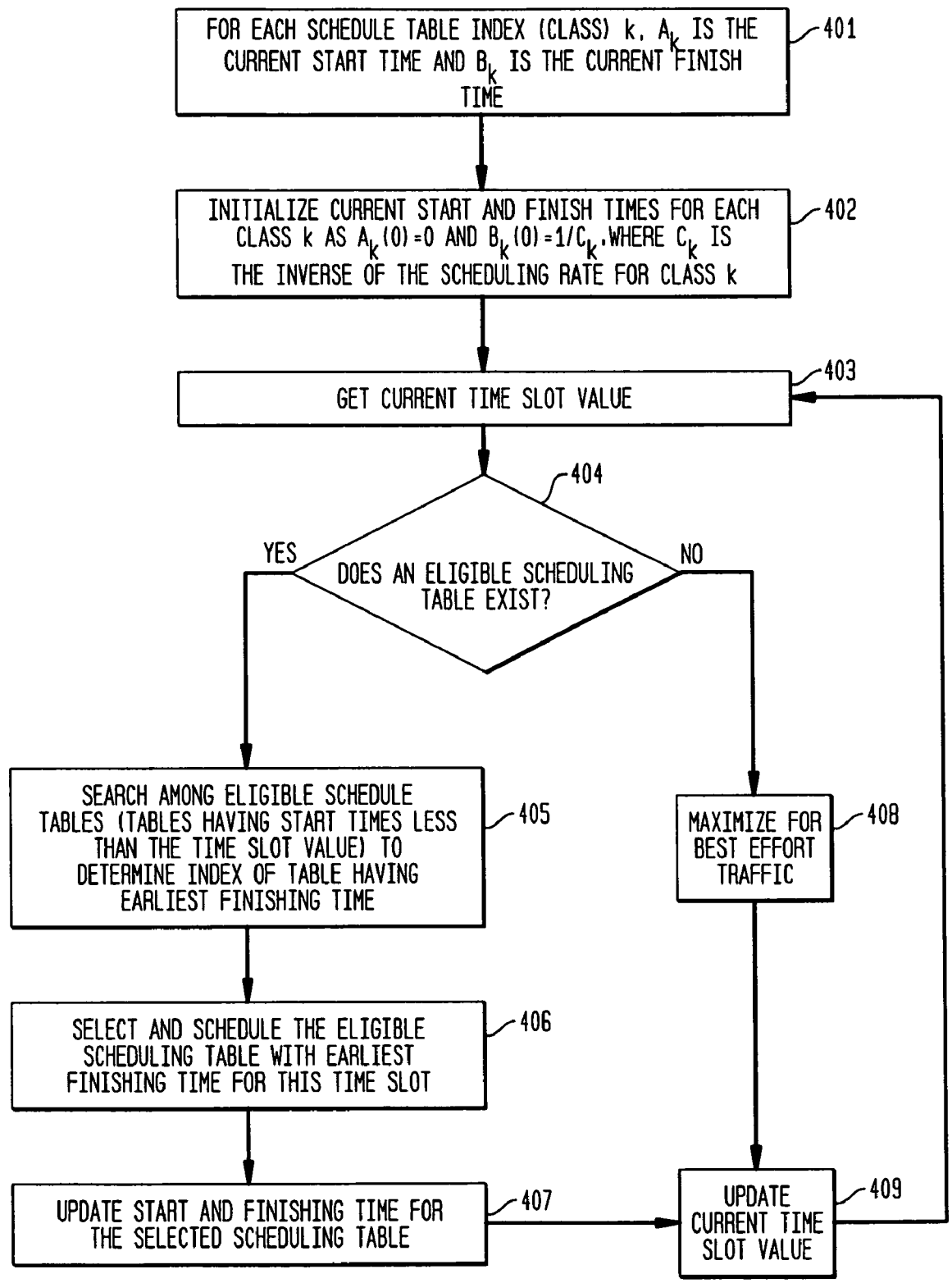
FIG. 4 shows an exemplary method of scheduling each schedule table employed by the method of FIG. 2.

FIG. 4 shows an exemplary method of scheduling LJ decomposition in the switch. At step 401, the variable $A_k$ is the current start time for schedule table k and $B_k$ is the current finish time for schedule table k. At step 402, the current start and finish times are initialized. The current start times are initialized to 0, and the current finish times are initialized to $C_k$, where $C_k$ is the inverse of $\phi_k$. At step 403, the value for the current time slot t is retrieved. At step 404, a test determines whether an eligible schedule table exists, where the kth schedule table is eligible if $A_k \le t$ and ineligible otherwise.

If the test of step 404 determines that an eligible schedule table exists, at step 405 a search is performed to find a schedule table with the earliest finishing time that may be scheduled during the current time slot t. At step 406, the schedule table with the earliest finishing time is selected and scheduled, and at step 407 the start time and the finish time for the first schedule table are updated. Updating the selected schedule table's start and finish times comprises setting the schedule table's current start time to its current finish time, and increasing the current finish time by the inverse of the schedule table's scheduling rate (i.e., increasing the finish time of the kth schedule table by $C_k$). From step 407, the method advances to step 409. At step 409, the current time slot value t is updated (e.g., incremented by 1), and from step 409 the method returns to step 403.

If the test of step 404 determines that no schedule table is eligible at the beginning of a given time slot, then at step 408 the input ports are matched to the outputs by an algorithm that, for example, optimizes the performance of best-effort traffic. Best-effort traffic may also use the time slots where guaranteed jitter traffic is not available to take its allotted slot or in the case where the schedule table is a partial permutation table. From step 408, the method advances to step 409 to update the current time slot value.

The following pseudo-code for routine LOW_JITTER_SCHEDULER may be employed to implement the method shown in FIG. 4:

LOW_JITTER_SCHEDULER

101: Let $A_k$ denote current start time and $B_k$ the current finish time for class k.

102:

$$\text{Set } A_k(0) = 0 \text{ and } B_k(0) = \frac{1}{\phi_k}.$$

103: Let t represent the current time slot.
104: Let l=Arg $\min_{k:A_k \le t} B_k$.
105: If l≠0 schedule $X^l$ in timeslot t.
106:

$$\text{Set } A_l \leftarrow B_l \text{ and } B_l = B_l + \frac{1}{\phi_l}$$

107: Set t←t+1 and go to Step 104.
108: If l=0 then set t←t+1 and go to Step 104.

While the exemplary embodiments of the present invention are described with respect to various equations, the present invention is not limited to the form of these equations. One skilled in the art may modify these equations by scaling, or may form different approximate solutions to the linear programming problems described herein employing any of a number of techniques well known in the art.

As would be apparent to one skilled in the art, the various functions of switching may be implemented with circuit elements or may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of routing one or more connections between input ports and output ports of a switch, the method comprising the steps of:
   (a) generating a rate matrix for the one or more connections, wherein each element of the rate matrix defines a bandwidth value for a connection between an input port and an output port of the switch during a scheduling period;

(b) decomposing the rate matrix into a set of schedule tables with a low jitter decomposition algorithm having a set of constraints including a constraint that each entry in the rate matrix correspond to one element of the schedule tables; and (c) scheduling each schedule table during time slots of the scheduling period in accordance with the weight associated with the scheduling table.

2. The invention of claim 1, further comprising the step of routing data through each connection based on each schedule table.

3. The invention of claim 1, wherein, for step (b), decomposing with the low jitter decomposition algorithm comprises the steps of forming an integer programming problem based on a bandwidth requirement of the rate matrix and solving the integer programming problem based on the constraints.

4. The invention of claim 3, wherein the step of solving the integer programming problem comprises the steps of:
(b1) sorting the elements of the rate matrix into an ordered list;
(b2) forming a sub-matrix for a schedule table;
(b3) selecting non-conflicting elements in the list for the sub-matrix;
(b4) deleting each selected element from the list,
(b5) updating the weight associated with the schedule table; and
(b6) repeating steps (b1) through (b5) for each subsequent schedule table until the list is empty.

5. The invention of claim 1, wherein, for step (b), the set of constraints include:
i) the schedule tables are partial permutation matrices, and
ii) the weighted sum of the partial permutation matrices is greater than or equal to the weighted sum of the rate matrix.

6. The invention of claim 1, wherein step (c) comprises the steps of:
(c1) initializing start and finish times for each schedule table, wherein the finish time is based on an associated scheduling rate, wherein the scheduling rate is the weight of the schedule table divided by the switch speed;
(c2) determining, for each time slot, whether at least one eligible schedule table exists;
(c3) selecting for the time slot, if an eligible schedule table exists, the schedule table having the earliest finishing time;
(c4) updating the start and finish times for the selected time slot; and
(c5) repeating steps (c1) through (c4) for each time slot of the scheduling period.

7. The invention of claim 6, wherein, for step (c2), if no eligible schedule table exists, maximize routing for the time slot for best-effort connections through the switch.

8. The invention as recited in claim 1, wherein the method is implemented by a processor of a switch of a packet network.

9. Apparatus for routing one or more connections between input ports and output ports of a switch, the apparatus comprising:
a processor having:
a first module adapted to generate a rate matrix for the one or more connections, wherein each element of the rate matrix defines a bandwidth value for a connection between an input port and an output port of the switch during a scheduling period;
a second module adapted to decompose the rate matrix into a set of schedule tables with a low jitter decomposition algorithm having a set of constraints including a constraint that each entry in the rate matrix correspond to one element of the schedule tables; and
a scheduler adapted to schedule each schedule table during time slots of the scheduling period in accordance with the weight associated with the scheduling table.

10. The invention of claim 9, further comprising a switch adapted to route data through each connection based on each schedule table.

11. The invention of claim 9, wherein the decomposition with the low jitter decomposition algorithm forms an integer programming problem based on a bandwidth requirement of the rate matrix and solving the integer programming problem based on the constraints.

12. The invention of claim 11, wherein the second module solves the integer programming problem by:
(1) sorting the elements of the rate matrix into an ordered list;
(2) forming a sub-matrix for a schedule table;
(3) selecting non-conflicting elements in the list for the sub-matrix;
(4) deleting each selected element from the list,
(5) updating the weight associated with the schedule table; and
(6) repeating (1) through (5) for each subsequent schedule table until the list is empty.

13. The invention of claim 9, wherein the set of constraints include:
i) the schedule tables are partial permutation matrices, and
ii) the weighted sum of the partial permutation matrices is greater than or equal to the weighted sum of the rate matrix.

14. The invention of claim 9, wherein the scheduler is adapted to:
1) initialize start and finish times for each schedule table, wherein the finish time is based on an associated scheduling rate, wherein the scheduling rate is the weight of the schedule table divided by the switch speed;
2) determine, for each time slot, whether at least one eligible schedule table exists;
3) select for the time slot, if an eligible schedule table exists, the schedule table having the earliest finishing time;
4) update the start and finish times for the selected time slot; and
5) repeat 1) through 4) for each time slot of the scheduling period.

15. The invention of claim 14, wherein, if no eligible schedule table exists, the scheduler maximizes routing for the time slot for best-effort connections through a switch.

16. The invention as recited in claim 9, wherein the apparatus is included in a switch of a packet network.

17. A computer-readable medium having stored thereon a plurality of instructions, the plurality of instructions including instructions which, when executed by a processor, cause the processor to implement a method for routing one or more connections between input ports and output ports of a switch, the method comprising the steps of:
(a) generating a rate matrix for the one or more connections, wherein each element of the rate matrix defines a bandwidth value for a connection between an input port and an output port of the switch during a scheduling period;

(b) decomposing the rate matrix into a set of schedule tables with a low jitter decomposition algorithm having a set of constraints including a constraint that each entry in the rate matrix correspond to one element of the schedule tables; and (c) scheduling each schedule table during time slots of the scheduling period in accordance with the weight associated with the scheduling table.

18. A method of routing one or more connections between input ports and output ports of a switch, the method comprising the steps of:

(a) generating a rate matrix for the one or more connections, wherein each element of the rate matrix defines a bandwidth value for a connection between an input port and an output port of the switch during a scheduling period;

(b) decomposing the rate matrix into a set of schedule tables with a low jitter decomposition algorithm having a set of constraints; and (c) scheduling each schedule table during time slots of the scheduling period in accordance with the weight associated with the scheduling table;

wherein:

for step (b), decomposing with the low jitter decomposition algorithm comprises the steps of forming an integer programming problem based on a bandwidth requirement of the rate matrix and solving the integer programming problem based on the constraints; and the step of solving the integer programming problem comprises the steps of:

(b1) sorting the elements of the rate matrix into an ordered list;

(b2) forming a sub-matrix for a schedule table;

(b3) selecting non-conflicting elements in the list for the sub-matrix;

(b4) deleting each selected element from the list, (b5) updating the weight associated with the schedule table; and (b6) repeating steps (b1) through (b5) for each subsequent schedule table until the list is empty.

19. Apparatus for routing one or more connections between input ports and output ports of a switch, the apparatus comprising:

a processor having:

a first module adapted to generate a rate matrix for the one or more connections, wherein each element of the rate matrix defines a bandwidth value for a connection between an input port and an output port of the switch during a scheduling period;

a second module adapted to decompose the rate matrix into a set of schedule tables with a low jitter decomposition algorithm having a set of constraints; and a scheduler adapted to schedule each schedule table during time slots of the scheduling period in accordance with the weight associated with the scheduling table;

wherein:

the decomposition with the low jitter decomposition algorithm forms an integer programming problem based on a bandwidth requirement of the rate matrix and solving the integer programming problem based on the constraints; and the second module solves the integer programming problem by:

(1) sorting the elements of the rate matrix into an ordered list;

(2) forming a sub-matrix for a schedule table;

(3) selecting non-conflicting elements in the list for the sub-matrix;

(4) deleting each selected element from the list, (5) updating the weight associated with the schedule table; and (6) repeating (1) through (5) for each subsequent schedule table until the list is empty.

20. A method of routing one or more connections between input ports and output ports of a switch, the method comprising the steps of:

(a) generating a rate matrix for the one or more connections, wherein each element of the rate matrix defines a bandwidth value for a connection between an input port and an output port of the switch during a scheduling period;

(b) decomposing the rate matrix into a set of schedule tables with a low jitter decomposition algorithm having a set of constraints; and (c) scheduling each schedule table during time slots of the scheduling period in accordance with the weight associated with the scheduling table, wherein step (c) comprises the steps of:

(c1) initializing start and finish times for each schedule table, wherein the finish time is based on an associated scheduling rate, wherein the scheduling rate is the weight of the schedule table divided by the switch speed;

(c2) determining, for each time slot, whether at least one eligible schedule table exists;

(c3) selecting for the time slot, if an eligible schedule table exists, the schedule table having the earliest finishing time;

(c4) updating the start and finish times for the selected time slot; and (c5) repeating steps (c1) through (c4) for each time slot of the scheduling period.

21. The invention of claim 20, wherein, for step (c2), if no eligible schedule table exists, maximize routing for the time slot for best-effort connections through the switch.

22. Apparatus for routing one or more connections between input ports and output ports of a switch, the apparatus comprising:

a processor having:

a first module adapted to generate a rate matrix for the one or more connections, wherein each element of the rate matrix defines a bandwidth value for a connection between an input port and an output port of the switch during a scheduling period;

a second module adapted to decompose the rate matrix into a set of schedule tables with a low jitter decomposition algorithm having a set of constraints; and a scheduler adapted to schedule each schedule table during time slots of the scheduling period in accordance with the weight associated with the scheduling table, wherein the scheduler is adapted to:

1) initialize start and finish times for each schedule table, wherein the finish time is based on an associated scheduling rate, wherein the scheduling rate is the weight of the schedule table divided by the switch speed;

2) determine, for each time slot, whether at least one eligible schedule table exists;
3) select for the time slot, if an eligible schedule table exists, the schedule table having the earliest finishing time;
4) update the start and finish times for the selected time slot; and
5) repeat 1) through 4) for each time slot of the scheduling period.

23. The invention of claim 22, wherein, if no eligible schedule table exists, the scheduler maximizes routing for the time slot for best-effort connections through a switch.

* * * * *